(12) United States Patent
Damodaran

(10) Patent No.: US 6,310,105 B1
(45) Date of Patent: Oct. 30, 2001

(54) CARBOXYL-MODIFIED SUPERABSORBENT PROTEIN HYDROGEL

(75) Inventor: Srinivasan Damodaran, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 09/504,571

(22) Filed: Feb. 15, 2000

(51) Int. Cl.[7] ............................. C08H 1/00; C08J 3/24; C08J 3/075
(52) U.S. Cl. .................. 516/103; 530/402; 530/409; 530/410; 106/124.3; 106/155.2; 106/156.22; 106/156.23; 106/156.3; 106/156.31
(58) Field of Search ........................... 516/103; 530/402, 530/409, 410; 106/124.3, 155.2, 156.22, 156.23, 156.3, 156.31

(56) References Cited

U.S. PATENT DOCUMENTS

| | | |
|---|---|---|
| 2,729,628 | 1/1956 | Mann . |
| 2,923,691 | 2/1960 | Young et al. . |
| 3,685,998 | 8/1972 | Miller . |
| 3,720,765 | 3/1973 | Miller . |
| 4,264,493 | 4/1981 | Battista . |
| 4,349,470 | 9/1982 | Battista . |
| 4,416,814 | 11/1983 | Battista . |
| 4,883,864 * | 11/1989 | Scholz ................................ 530/356 |
| 5,514,379 * | 5/1996 | Battista ............................. 424/426 |
| 5,847,089 | 12/1998 | Damodaran et al. . |

FOREIGN PATENT DOCUMENTS

| | | |
|---|---|---|
| 1569878 | 6/1980 | (GB) . |
| WO 94/03155 | 2/1994 | (WO) . |

OTHER PUBLICATIONS

D–C.Hwang and S. Damodaran, Synthesis and Properties of Fish Protein–Based Hydrogel. *J. Amer. Oil Chem. Soci.* 74, 1165 (1997).

R. J. Hall, N. Trinder and D.I. Givens, Observations on the Use of 2,4,6–trinitrobenzenesulphonic Acid for the Determination of Available Lysine in Animal Protein Concentrates. *Analyst*, 98, 673 (1973).

D–C. Hwang and S. Damodaran, Chemical Modification Strategies for Synthesis of Protein–based Hydrogel. *J. Agric. Food Chem.* 44, 751 (1996).

D–C.Hwang and S. Damodaran, Equilibrium Swelling Properties of a Novel Ethylenediaminetetraacetic Dianhydride (EDTAD)–modified soy protein hydrogel. *J. Appl. Polym. Sci.*, 62, 1285 (1996).

S.H. Gehrke, Equilibrium Swelling, Kinetics, Permeability and Applications of Environmentally Responsive Gels. In Advances in Polymer Science 110—Responsive Gels: Volume Transitions II, K. Dusek, Ed., Springer–Verlag, Berlin, Heidelberg, (1993) p. 83.

N. Nio, M. Motoki, and K. Takinami, Gelation of Casein an dSoybean Globulins by Transglutaminase, *Agric. Biol. Chem.* (1985) No month provided, 49(8):2283–2286.

Y. Okuyama, R. Yoshida, K. Sakai, T. Okano, and Y. Sakurai, *J. Biomater. Sci. Polym. Ed.*, 4, 545 (1993) No month provided.

A. Dave, U. Vaishnav, R. Desai, A. Shah, B. Ankleshwaria, and M. Mehta, *J. Appl. Polym. Sci.* 58, 853 (1995). No month provided.

S. M. Kelly and N.C. Price, *Biochemica Biophysica Acta* 1338, 161 (1997). No month provided.

R. W.Woody, in *Methods in Enzymology*, C. H. W. Hirs, Ed., Academic, New York, (1995) No month provided vol. 246, p. 34–71.

N. J. Greenfield, *Annal. Biochem.* 235, 1 (1996) No month provided.

J. T. Yang, C. –S. C. Wu, H. M. Martinez, in *Methods in Enzymology*, C. H. W. Hirs, Ed., Academic, New York, (1986) No month provided vol. 130, p. 208–269.

\* cited by examiner

*Primary Examiner*—David Brunsman
(74) *Attorney, Agent, or Firm*—Joseph T. Leone, Esq.; DeWitt Ross & Stevens S.C.

(57) ABSTRACT

The present invention is a biodegradable, reversibly-swellable, polyvalent cation-binding, protein hydrogel which comprises an acylated protein matrix in which the acylated protein matrix is crosslinked with a bifunctional crosslinking reagent, and treated with a polar organic solvent, and a method of making the same.

27 Claims, 7 Drawing Sheets

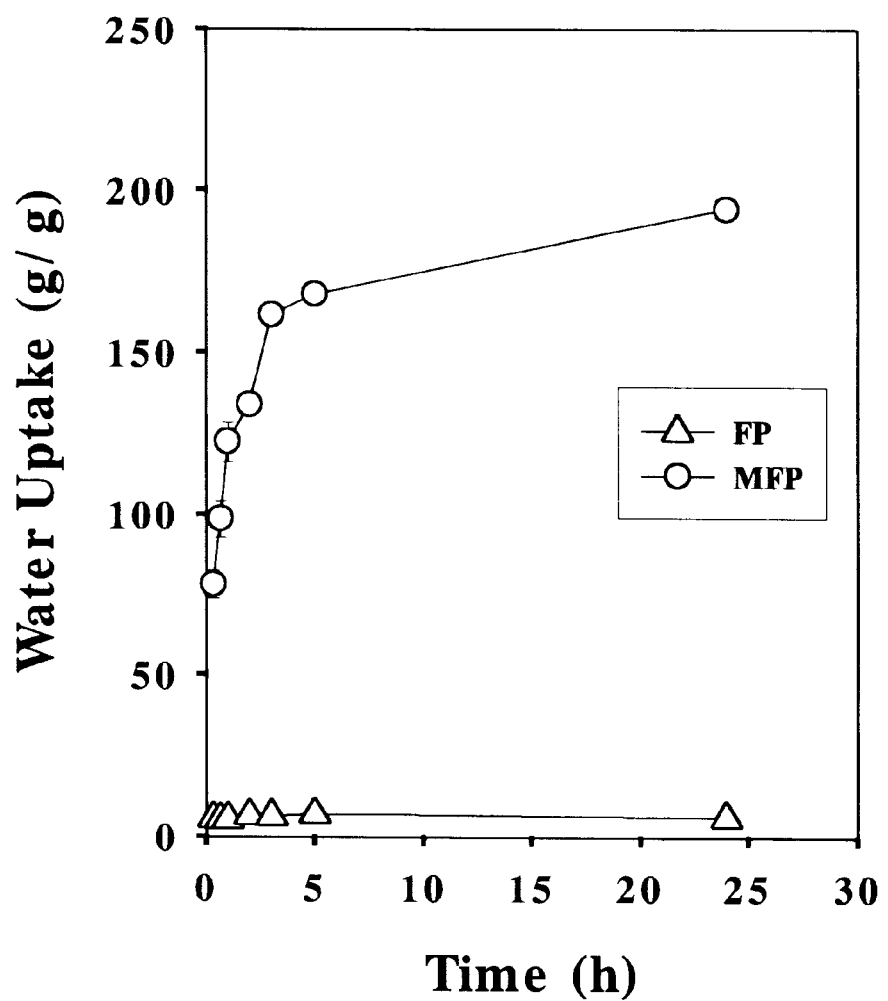
Figure 1. Water Uptake of Unmodified Fish Protein (FP) and 80%EDTAD-Modified Fish Protein (MFP) Hydrogels.

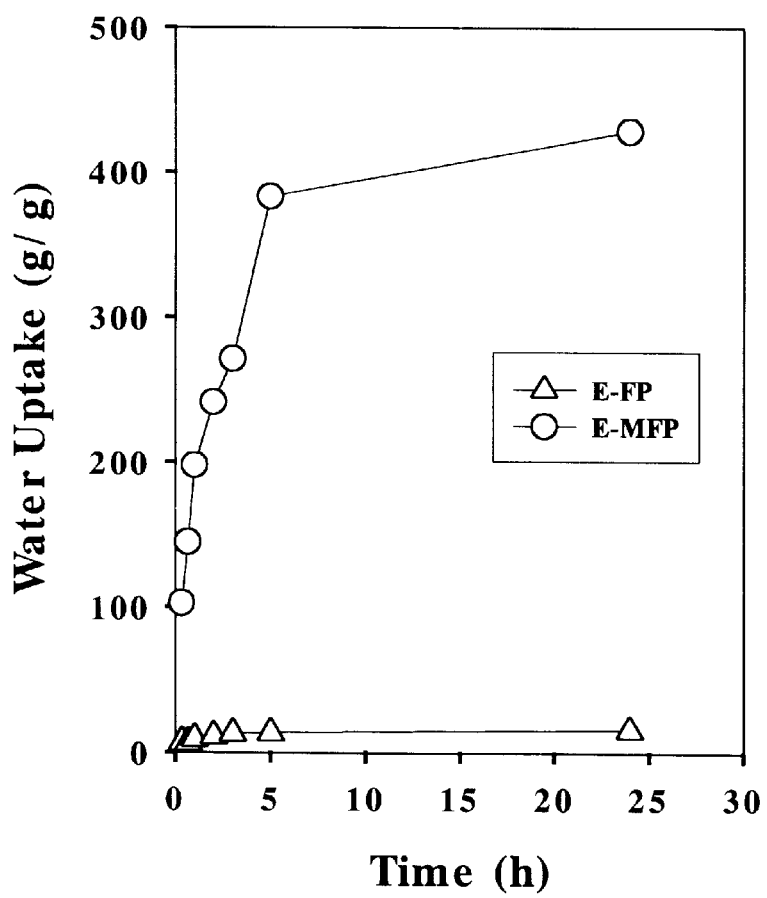
Figure 2. Water Uptake of Ethanol-Treated Fish Protein (E-FP) and Ethanol-Treated 80%EDTAD-Modified Fish Protein (E-MFP) Hydrogels.

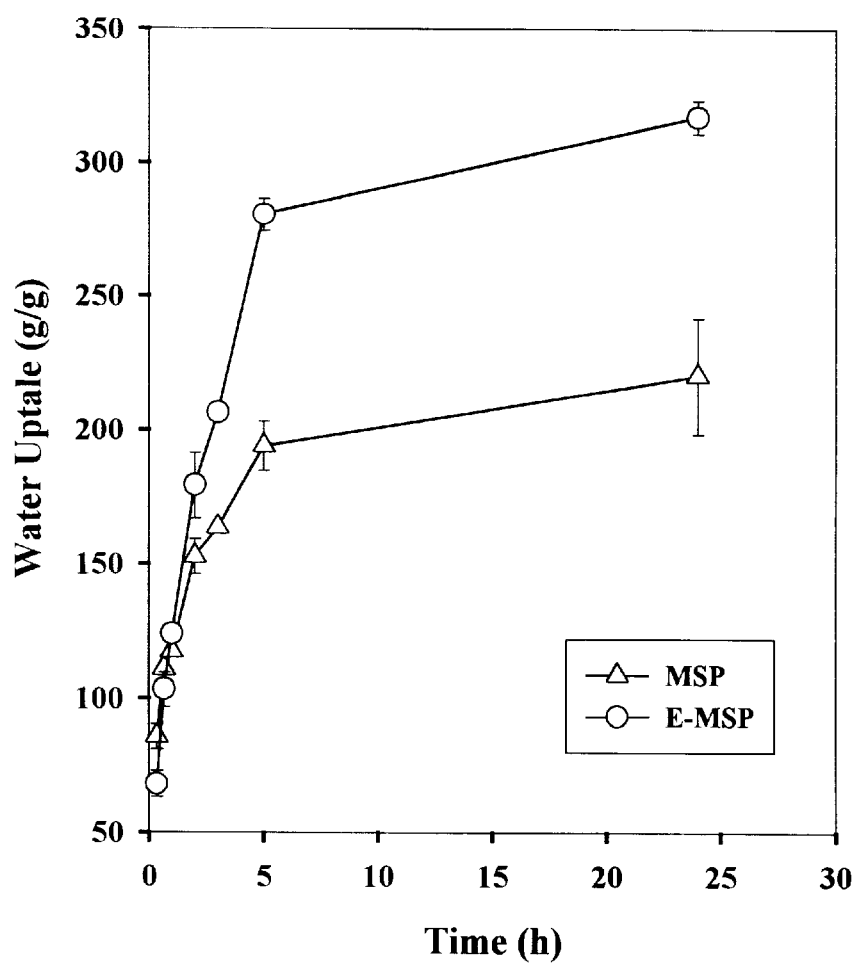
Figure 3. Water Uptake of 60%EDTAD-Modified Soya Protein (MSP) and Ethanol-Treated 60%EDTAD-Modified Soya Protein (E-MSP) Hydrogels.

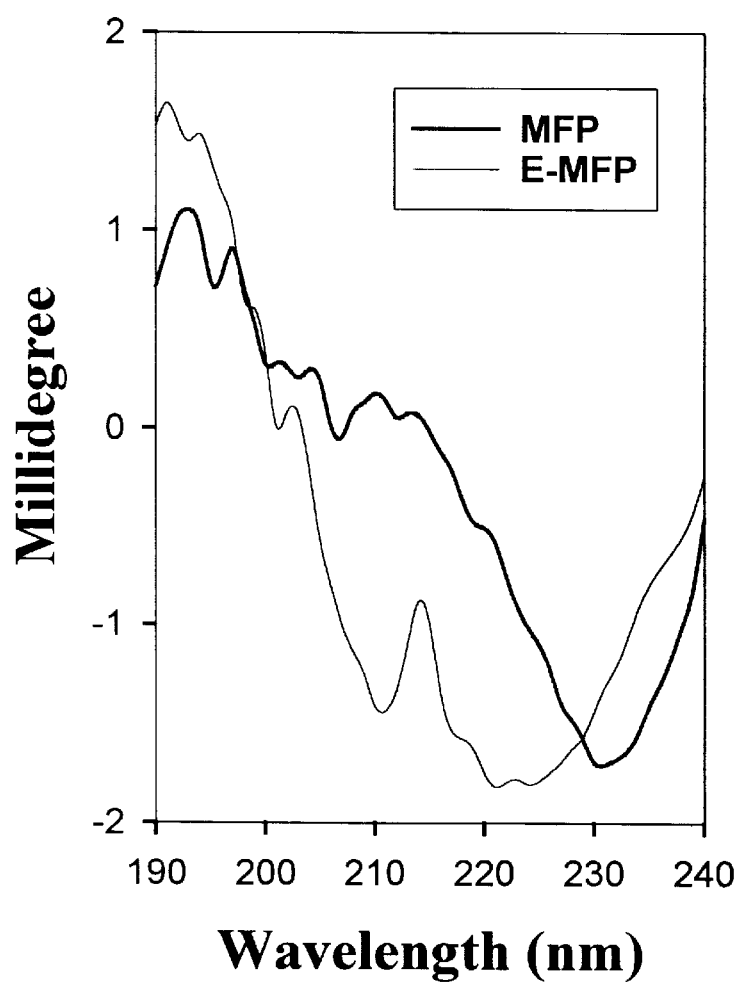
Figure 4. CD spectra of 80% EDTAD-FP (MFP) and Ethanol-treated 80%EDTAD-FP (E-MFP) Hydrogels

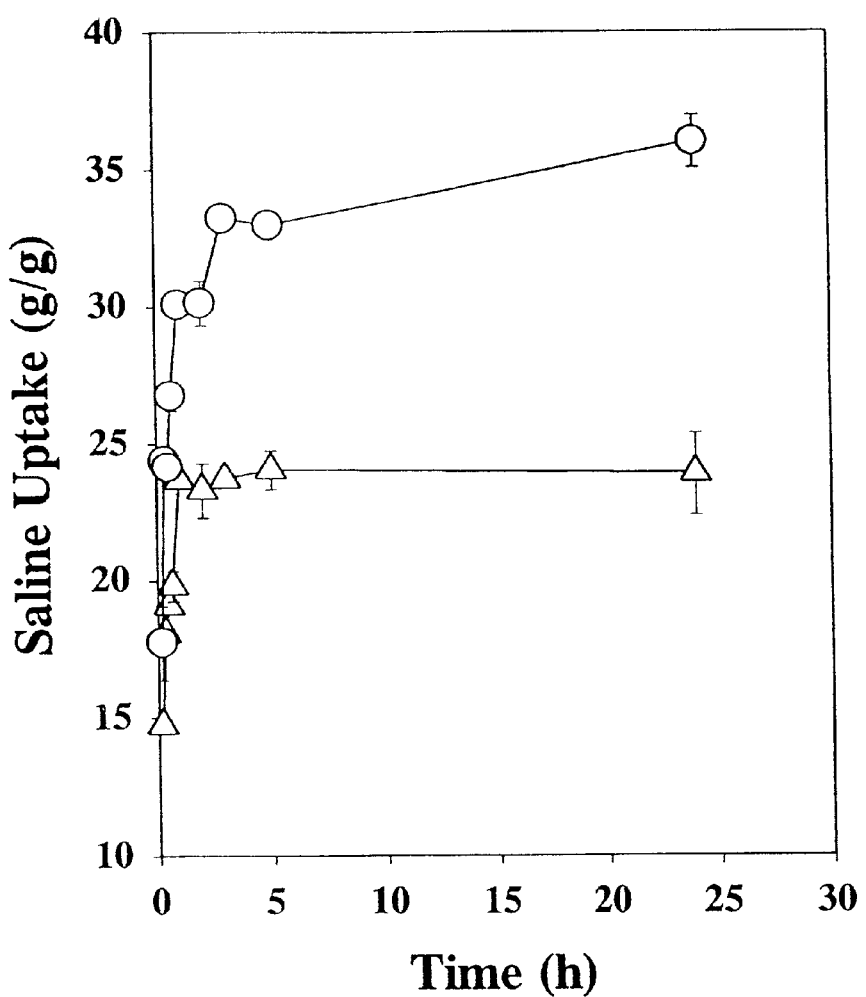
Figure 5A. Saline Uptake of 80%EDTAD-Modified Fish Protein (MFP) and Ethanol-Treated 80%EDTAD-Modified Fish Protein (E-MFP) Hydrogels in 0.1M NaCl.

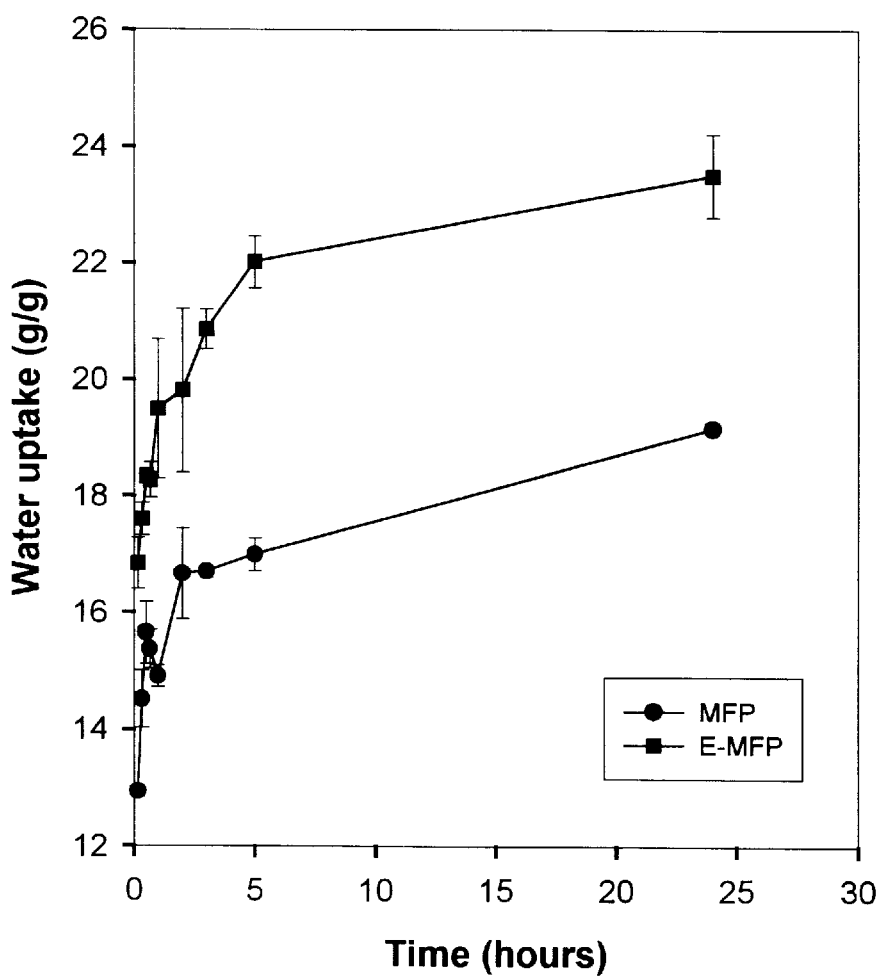
Figure 5B: Saline Uptake of 80% EDTAD-Modified Fish Protein (MFP) and Ethanol-Treated 80% EDTAD-Modified Fish Protein (E-MFP) Hydrogels in 0.15 M NaCl.

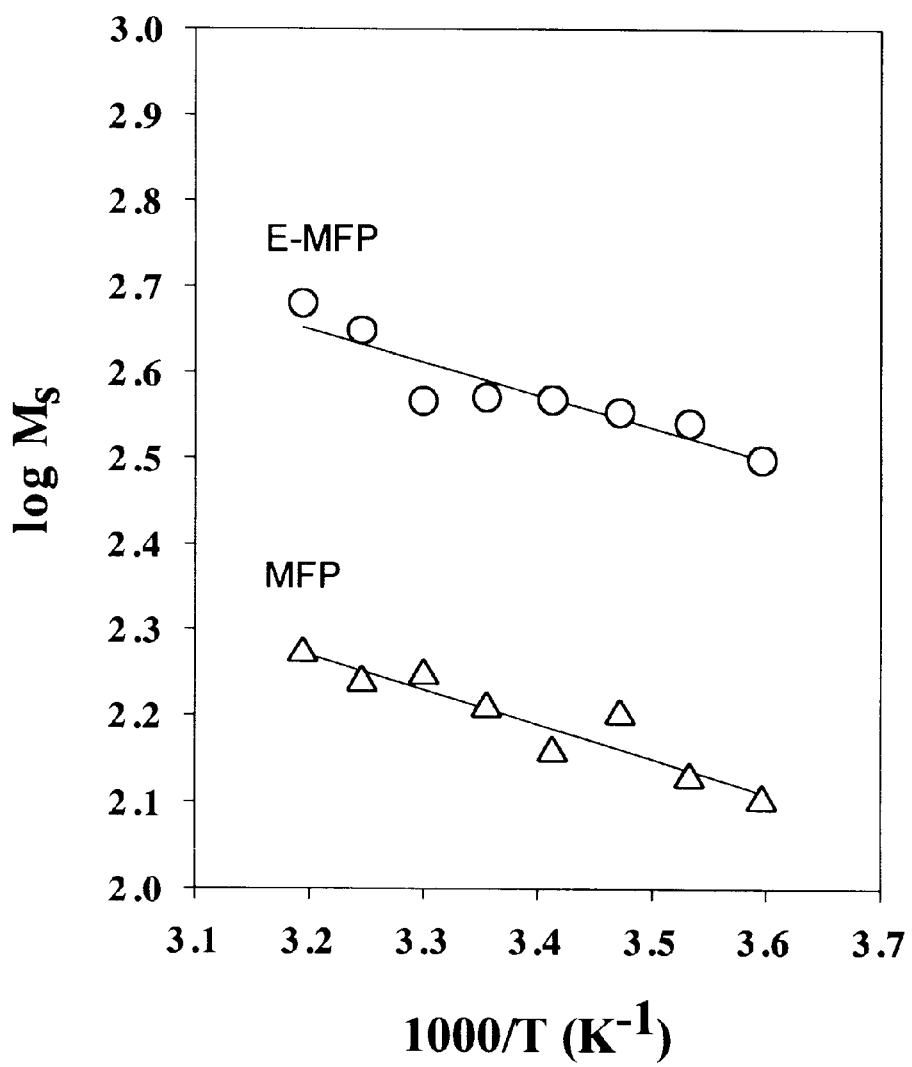
Figure 6. Van't Hoff plots of log Ms (maximum swelling) vs Reciprocal Temperature for 80%EDTAD-Modified Fish Protein (MFP) and Ethanol-treated 80%EDTAD-Modified Fish Protein (E-MFP) Hydrogels.

CARBOXYL-MODIFIED SUPERABSORBENT PROTEIN HYDROGEL

This invention was made with United States government support awarded by the following agencies: NOAA NA86RG0047. The United States has certain rights in the invention.

FIELD OF THE INVENTION

The present invention relates to protein hydrogels. More specifically, the present invention relates to chemically modified protein hydrogels which are capable of absorbing a large amount of water or other liquid per unit mass.

BIBLIOGRAPHIC CITATIONS

Complete bibliographic citations to the numbered references discussed herein are contained in the bibliography section, directly preceding the Claims.

DESCRIPTION OF THE RELATED ART

Beginning in the early 1970's, and continuing to the present day, there has been a growing awareness that the continued widespread use of non-biodegradable, petroleum-based polymeric materials may pose serious environmental concerns. These concerns are heightened by production statistics showing the enormous and still-growing volume of non-biodegradable plastics produced annually, the vast majority of which are ultimately interred in landfills. This raises concerns not only as to the amount of space available for solid waste disposal (which is disappearing at an increasingly rapid pace), but also raises equally serious concerns that the leaching of toxic monomers and oligomers from landfilled plastics will contaminate ground water, thereby causing health problems in humans and animals.

In addition to concerns regarding human health and the environment, the world-wide depletion of petroleum reserves, in combination with wildly fluctuating petroleum prices due to political and economic conflicts, indicates that less dependence on petroleum-derived products might be prudent. Therefore, the development of alternative, and renewable, resources for industrial products is needed.

Because of the factual and/or perceived economic, environmental, and public health concerns accompanying non-biodegradable, petroleum-based products, a non-petroleum-based, environmentally safe, biodegradable, and renewable source for industrial products is needed. As evidenced by the following references, several types of useful products have been fabricated from renewable sources of starting materials.

For instance, Mann, U.S. Pat. No. 2,729,628, describes a process for increasing the intrinsic viscosity of a long chain polypeptide, particularly natural proteins such as fish, peanut protein, soybean protein, casein, egg albumin, and blood albumin by acylating the protein with terephthalyl dichloride. Here, the protein is reacted with the terephthalyl dichloride using the Schotten-Baumann method at a temperature of from about 0° to 30° C.

Young etal., U.S. Pat. No. 2,923,691, describe the polymerization of animal proteins to improve their characteristics for use as animal glue. Young et al. introduce aldehydes to an animal glue protein so as to modify the viscosity and jelly characteristics of the glue product without solidifying or insolubilizing the protein. Here, Young et al. are interested in increasing the viscosity and jelly strength of last run animal glues, which tend to be of inferior quality. The process described by Young et al. includes two steps: first, a cyanic acid salt is reacted with the protein material; second, an aldehyde, such as formaldehyde or glucose, is added to the protein material.

Two patents to Miller (U.S. Pat. Nos. 3,685,998 and 3,720,765), and assigned to the Monsanto Company, describe improved protein feed materials for ruminants. In the Miller patents, protein feeds are rendered resistant to digestive breakdown in the rumen, but not in the abomasum and intestines, by treating protein-containing feed material with a polymerized unsaturated carboxylic acid or anhydride. For instance, the proteinaceous feedstuff is treated with a polyanhydride such as poly(maleic anhydride). This renders the protein feedstuff substantially indigestible in the fluid medium of the rumen, yet still digestible in the acidic media of the abomasum and the intestines. In this manner the proteins of the feedstuff are spared breakdown in the rumen, and are available for absorption in the subsequent digestive organs.

Three patent references to Battista (U.S. Pat. Nos. 4,264,493; 4,349,470; and 4,416,814) describe the formation of protein hydrogel structures formed from natural proteins having molecular weights not exceeding 100,000 by dissolving the protein in an aqueous acidic solution, crosslinking the protein, and air drying the solution to a moisture content not exceeding 10 percent. The Battista patents are largely drawn to the formation of clear products such as soft contact lenses, ophthalmological films, and the like.

Although Battista refers to the compositions described therein as hydrogels, that term is defined within the Battista references as meaning "a crosslinked protein polymer of natural origin having an average molecular weight of about 100,000 or less, capable of being swollen by water over a wide range of water contents ranging from as low as 30 percent to 1,000 percent and higher while possessing useful rheological control properties for specific end product uses." (See for instance, U.S. Pat. No. 4,264,493, column 1, lines 19–27.) The hydrogels described by Battista are not designed to be superabsorbent. Rather, they are designed to be optically clear and to have sufficient mechanical integrity to function as soft contact lenses.

The protein hydrogel structures described in the Battista patents are made from natural protein raw materials that form clear solutions in water. The protein raw material is first dissolved in an acidic aqueous solution of from pH 3.5 to about pH 5.5. A crosslinking agent is then added to the acidic protein solution. Battista's preferred crosslinking agent is Formalin (37 percent formaldehyde); however, Battista describes other suitable crosslinking agents which may be used, including glutaraldehyde. It must be noted, however, that the Battista patents do not describe acyl-modification of the protein starting material. Nor do the Battista patents describe a superabsorbent protein hydrogel. The protein hydrogels described in the Battista references are designed to have increased wet strength capabilities, thereby enabling their use in soft contact lenses.

Many disadvantages which accompany synthetic hydrogels (such as non-biodegradability) can be overcome by using hydrogels derived from natural polymer sources. In addition to chemically-crosslinked protein hydrogels, such as those described by Battista, many proteins can be thermally induced to form gels. The most critical requirements for any type of biopolymer hydrogel are that the gel should have the capacity to absorb a large amount of water relative to its mass upon rehydration, and that the gel material itself should resist dissolution.

However, conventional thermally-induced protein hydrogels do not swell to their original gel volume after they have been dehydrated. This decreased swelling capacity is related to increased hydrogen bonding, as well as electrostatic and hydrophobic interactions which occur in the dehydrated protein. The loss of swelling of thermally-induced protein hydrogels limits their range of industrial applicability.

U.S. Pat. No. 5,847,089 to Damodaran et al. describes a protein hydrogel which is superabsorbent, reversibly swellable, biodegradable, and capable of binding cations. The protein hydrogel described in Damodaran et al. is made by treating a protein with an acylating agent and crosslinking the acylated protein with a bifunctional crosslinking agent to form a protein hydrogel. A shortcoming of Damodaran et al. is that residual crosslinking agent can remain in the gel, thereby making the gel less desirable for some applications in which residues from crosslinkers, such as gluteraldehyde, are a concern.

In view of this, there is a clear need for a protein hydrogel which is highly absorbent, biodegradable, reversibly swellable, and which is substantially free of residual crosslinkers used to produce such hydrogels. The present invention provides such a protein hydrogel.

Perhaps the most desirable of renewable production materials is agricultural biomass. This is due, in large part, to the tremendous amount and variety of agricultural products which are produced in the United States. For instance, biomass (mainly maize) is currently used to produce ethanol for fuel. Fibrous biomass is widely used in the paper and forest products industry. Starch-derived products are also widely utilized in various industrial applications, such as the packing industry, in addition to their use in the food industry.

However, among biopolymers, proteins are perhaps the most under-utilized and under-rated in terms of their industrial applications. They are primarily regarded solely as functional and nutritional ingredients in foodstuffs. Their enormous potential as structural elements in non-food industrial applications is largely unrecognized and unrealized. This is unfortunate because proteins offer several distinct advantages over more conventional types of biomass.

For example, unlike polyol-based natural polymers, such as cellulose and other carbohydrates, proteins contain several reactive side groups, including amino, hydroxyl, sulfhydryl, phenolic, and carboxyl moieties. These reactive groups can be used as sites of chemical modification and crosslinking to produce novel polymeric structures. The present invention relates to such a novel polymeric structure: a protein-based, biodegradable, superabsorbent hydrogel.

As a generic class of polymers, hydrogels of all types find high volume uses in industrial applications, consumer products, and environmental applications. Such applications include diapers, catamenial devices, and industrial absorbents. As used herein, the unqualified term "hydrogel" refers to any naturally-occurring or synthetic material which exhibits the ability to swell in water or some other liquid and to retain a significant fraction of liquid within its structure, but which will not dissolve in the liquid.

Several synthetic hydrogel materials are currently in use. These include such synthetic hydrogels as poly (hydroxyalkyl methacrylates), polyacrylate, poly (acrylamide), poly(methacrylamide) and derivatives thereof, poly(N-vinyl-2-pyrrolidone), and poly(vinylalcohol). While these synthetic hydrogel polymers exhibit several interesting properties, their use in industrial, consumer, and environmental applications is less than desirable because of the toxicity of residual monomers and oligomers which are normally present in these gels. Moreover, the poor biodegradability of these synthetic hydrogels also poses the long-term environmental concerns discussed above.

Clearly then, there exists the need for a biodegradable, superabsorbent, biomass-derived hydrogel which exhibits reversible swelling, and which is substantially free of residual crosslinker used to produce such hydrogels.

SUMMARY OF THE INVENTION

In view of the above discussion, it is a principal aim of the present invention to provide a protein hydrogel which is superabsorbent, reversibly swellable, biodegradable, and capable of binding divalent cations. The protein hydrogel is also substantially free of residual crosslinker used to produce such hydrogels.

A further aim of the invention is to provide a protein hydrogel which can be formed from a wide range of protein starting materials, and which can be used as a substitute for wholly synthetic hydrogels.

In its simplest embodiment, the present invention relates to a protein hydrogel which comprises an acylated protein matrix which has been crosslinked with a bifunctional crosslinking reagent, and which has been treated with a polar organic solvent to remove residual crosslinker.

More specifically, the present invention includes a protein hydrogel which comprises a fish protein isolate which has been acylated by treatment with ethylenediaminetetraacetic acid dianhydride (EDTAD) to yield an acylated protein matrix. The acylated protein matrix is then crosslinked with glutaraldehyde to yield a biodegradable, superabsorbent, protein hydrogel. The crosslinked gel is then treated with a polar organic solvent (preferably ethanol).

The solvent treatment induces conformational reorganization in protein chains in the gel network, which apparently increases flexibility and hence the rate and extent of relaxation of the polymer network as water diffluses into the network. In addition to improving the swelling properties, the ethanol treatment offers the following advantages: 1) ethanol dehydrates the gel and thereby eliminates the need for drying the gel; 2) ethanol extracts low molecular weight off-odor compounds from the protein gel, especially from the fish protein gel, and thereby improves its acceptability in several consumer products-the ethanol-treated fish protein hydrogel was found to be completely free of fishy off-odor compared to that made without ethanol treatment; and 3) ethanol also extracts any residual un-reacted glutaraldehye (believed to be carcinogenic) that might be present in the gel.

The protein hydrogels of the present invention are capable of absorbing more than 100 times (and often more than 200 times) their dry weight in water. They are also capable of sequestering divalent cations.

The present invention also includes a method of making the protein hydrogel described immediately above. The method includes the steps of treating a protein with an acylating agent to yield an acylated protein matrix, crosslinking the acylated protein matrix with a bifunctional crosslinking agent, and treating the crosslinked matrix with a polar organic solvent (preferably ethanol) to yield the protein hydrogel.

In more detail, the present invention includes a method of making a protein hydrogel which includes the steps of dissociating and/or unfolding protein molecules within an aqueous protein solution by application of heat, and then adding an acylating agent to the protein solution to yield an acylated protein. The acylated protein is then crosslinked by addition of a bifunctional crosslinking agent. The crosslinked matrix is then treated with a polar organic solvent (preferably ethanol) to induce conformational reorganization in protein chains in the gel network to yield the protein hydrogel.

The present invention is a protein hydrogel having the above-described properties. The protein from which the protein hydrogel is derived can be from any plant or animal source, without limitation. A preferred protein source, its preference derived in large part from its abundance and low cost, is fish-derived protein.

The protein hydrogel of the present invention is made by first chemically modifying lysyl residues of a protein by the addition of one or more carboxyl moieties thereto. Preferably, this is done by acylation of the lysyl residues with a polycarboxylic acid anhydride. This is followed by crosslinking of the protein chains with a bifunctional crosslinking agent and treating the protein with a polar solvent to yield a protein hydrogel that exhibits superabsorbent, pH-sensitive and ionic strength-sensitive reversible swelling, and which is substantially free of residual crosslinker.

The protein hydrogel of the present invention also strongly binds divalent cations. This enables the protein hydrogel to function as a cationic sequestering agent. The protein hydrogel can be used to remove divalent metal cations and organic cations from ground water, effluent liquid waste streams, and the like.

In operation, the protein hydrogel can be used wherever high absorption of liquid, or sequestering of divalent cations is desired. Potential end uses for the protein hydrogel include cosmetic products, diapers, tampons and menstrual pads, industrial absorbents, spill dams and sealers, ground and waste water reclamation applications, heavy metal sequestration, and the like.

The objects and advantages of the invention will appear more fully from the following detailed description of the preferred embodiment of the invention made in conjunction with the accompanying drawings.

BRIEF DESCRIPTION OF THE DRAWINGS

FIG. 1 is a graph showing water uptake of unmodified fish protein (FP) (Δ) and 80% EDTAD-modified FP hydrogels (○).

FIG. 2 is a graph illustrating the rate of water uptake of the gels of ethanol-treated unmodified-FP (Δ) and ethanol-treated 80% EDTAD-modified FP (○).

FIG. 3 is a graph depicting the effect of ethanol treatment on water uptake of 60% EDTAD-modified soya protein (SP) (Δ) and ethanol-treated 60% EDTAD-modified soya protein (○).

FIG. 4 is a graph showing far UV-CD spectra of swollen gels of 80% EDTAD-FP prepared with the ethanol treatment (bold line) and without the ethanol treatment (thin line).

FIG. 5A is a graph illustrating the effect of ethanol treatment swelling properties of 80% EDTAD-FP in 0.1 M NaCl at 36° C. (Δ=EDTAD-modified FP; ○=ethanol-treated EDTAD-modified FP).

FIG. 5B is a graph depicting the effect of ethanol treatment swelling properties of 80% EDTAD-FP in 0.15 M NaCl at 36° C. (Δ=EDTAD-modified FP; ○=ethanol-treated EDTAD-modified FP).

FIG. 6 shows Van't Hoff plots of log $M_s$ (maximum swelling) vs. 1T for 80% EDTAD-modified FP (Δ) and ethanol-treated EDTAD-modified FP (○), showing the effect of temperature on equilibrium water uptake.

DETAILED DESCRIPTION OF THE INVENTION

At the heart of the present invention is chemical modification of a protein so as first to introduce carboxyl moieties into the n-butylamino side groups of lysine residues within the protein. The modified protein molecules are then crosslinked using a bifunctional crosslinking agent to yield a protein hydrogel. The crosslinked protein matrix is then treated with a polar organic solvent to remove residual crosslinker and to yield a biodegradable, superabsorbent protein hydrogel which is substantially free of residual crosslinker.

The swelling properties of protein hydrogels described in U.S. Pat. No. 5,847,089 to Damodaran et al. can be dramatically improved by treating the cross-linked gel with ethanol. While not being limited to a particular mode or mechanism of action, this improvement occurs apparently because of ethanol-induced conformational reorganization in protein chains in the gel network. This rearrangement apparently increases flexibility and hence the rate and extent of relaxation of the polymer network as water diffuses into the network. In addition to improving the swelling properties, the ethanol treatment provides several additional advantages:

Treating the crosslinked protein matrix with a polar organic solvent dehydrates the gel. This eliminates the need for drying the gel after it has been formed.

Treating the crosslinked polymer matrix also extracts low molecular weight, off-odor compounds from the protein gel. This is particularly beneficial when the gel is formed from fish protein (or animal protein), which tend to retain an off odor. This effect greatly improves the commercial acceptability of the gel for use in numerous consumer products. Ethanol-treated fish protein hydrogel according to the present invention was found to be completely free of fishy off-odor compared to fish protein hydrogel made without ethanol treatment.

Treatment with a polar organic solvent extracts any residual un-reacted crosslinking reagent from the gel. This is especially beneficial if glutaraldehye (which is suspected to be carcinogenic) is used as the crosslinker. Treatment with the polar organic solvent removes any residual glutaraldehyde.

As noted above, the protein starting material can be selected from any source, animal, vegetable, or microbial, without limitation. For instance, while fish protein is preferred due to its low cost, the protein hydrogel described herein can be manufactured from other oilseed proteins, leaf proteins (e.g., alfalfa), microbial proteins, animal proteins, and proteins recovered from food processing wastes. Crude protein concentrates, as well as protein isolates will function equally well in the present invention. And, since the protein hydrogel is not generally intended for consumption, the starting material need not be of food grade.

The preferred protein source is fish, which are extracted with water to yield a fish protein isolate. Isolation of crude fish protein (FP) from fresh fish is carried out in conventional fashion, as described elsewhere (1). Generally, fresh fish upon arrival are filleted, chopped and blended with chilled de-ionized water at a meat-to-water ratio of 1:9. The suspension is then adjusted to pH 12 and stirred for 30 min. The suspension is filtered to remove the insoluble particles, and the filtrate is dialyzed against water and lyophilized.

Polar organic solvents useful in the present invention include $C_1$–$C_4$ alcohols (preferred), $C_1$–$C_4$ ketones (acetone preferred), and $C_1$–$C_4$ aldehydes (less preferred due to odor). Particularly preferred solvents for use in the present invention are ethanol, acetone, propanol, and butanol. The most preferred polar organic solvent is ethanol which will be used to exemplify the claimed invention. (The limitation to a description of using ethanol in the invention is for brevity only.)

Further isolation of the fish protein can be accomplished in any suitable fashion. For instance, this can be accomplished by treatment with acid to precipitate the proteins dissolved within the extract to yield fish protein isolate (FPI). The protein will normally precipitate from solution at about pH 4.5. The FPI may optionally be dialyzed or further purified (e.g., by recrystallization) if desired. Other isolation methods, such as evaporation of the solvent, or chromatography, can be used with equal success. Again, while the present invention may be practiced with any type of protein, for brevity and clarity only, the remainder of the specification shall be limited to as description of protein hydrogels made using the above-described FPI (which is the preferred protein).

After isolation, the FPI is then modified with a carboxylic group-containing acylating agent. The acylating agent reacts with n-butylamino groups of lysine residues within the FPI, and functions to introduce carboxyl moieties into the FPI. Preferably, the acylating agent is a polycarboxylic anhydride, a mono-anhydride, a dianhydride, or a combination thereof. As used herein, the term "anhydride" shall mean any of the preceding types of anhydrides. Suitable dianhydrides which can be used in the present invention include, for example, benzenetetracarboxylic dianhydride, cyclobutane tetracarboxylic dianhydride, diethylene-triamine-pentaacetic dianhydride, and ethylenediaminetet-raacetic acid dianhydride (EDTAD). EDTAD is the preferred acylating agent. Again, for brevity, the description which follows will be limited to addition of EDTAD to the FPI. This is for brevity and clarity only, and is understood not to limit the invention claimed herein in any fashion.

Introduction of the EDTAD into the FPI is performed by step-wise addition of solid EDTAD to an aqueous solution of FPI. It must be remembered, however, that EDTAD is a bifunctional reagent which is capable of cross-linking polypeptides either inter- or intramolecularly. Two possible reaction pathways for the reaction of EDTAD with a protein are shown below, wherein PRO is the protein being modified:

REACTION I

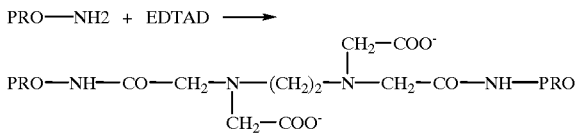

REACTION II

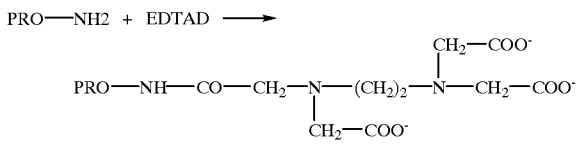

In Reaction I, one molecule of EDTAD reacts with two lysyl residues to form a linkage. When the reaction of the protein with EDTAD proceeds by Reaction I, the result is the incorporation of only one carboxyl moiety per lysyl residue. Moreover, if Reaction I occurs between subunits of a protein molecule, the intramolecular crosslinking may impair swelling of the modified protein.

In Reaction II, one molecule of EDTAD reacts with one lysyl residue and one water molecule. In this reaction, three carboxyl moieties per lysyl residue are incorporated into the protein, and no linkages are formed. This greatly increases the net anionic charge of the modified protein, which aids in unfolding the protein structure. Because no linkages are formed, the swellability of the modified protein is not impaired.

In light of the bifunctionality of EDTAD, in order to form a protein hydrogel having maximum absorbency, EDTAD should be added to the FPI under conditions which favor Reaction II over Reaction I. Conditions which favor Reaction II over Reaction I are those conditions wherein the protein is present in dilute solution, and the individual protein molecules are partially dissociated and/or denatured, thereby lessening the possibility of EDTAD reacting with two protein molecules. The reaction can be carried out at a temperature range of from about 5° C. to about 100° C. It is preferred that the reaction be conducted at mildly elevated temperatures, from ambient to about 100° C., under basic conditions, about pH 8 to pH 12. However, the reaction conditions should not be so rigorous as to cause hydrolytic degradation of the protein chains.

The preferred reaction protocol to optimize reaction of the protein by the mechanism of Reaction II is to first incubate the FPI in a dilute aqueous solution of about pH 12, at a mildly elevated temperature of about 65° C. The concentration of FPI in the solution should be on the order of about 1 percent. The FPI should be incubated for approximately 30 minutes at 65° C. Longer incubations times are acceptable so long as alkaline hydrolysis does not occur. The incubation period serves to dissociate and/or denature the protein molecules of the FPI.

The incubation may also be performed under acidic conditions, down to about pH 2. However, since the preferred acylation reaction takes place in alkaline solution, it is preferred that the incubation is also done under alkaline conditions so as to minimize salt formation during the acylation reaction.

After incubation, the solution is cooled to room temperature and a calculated amount of EDTAD is added in incremental amounts with continuous stirring. After complete addition of EDTAD, the reaction mixture is stirred constantly for 3 h while maintaining the pH at 12.0, preferably by the addition of base (preferably NaOH). This can be done automatically using a commercially-available pH-Stat apparatus (Fisher Scientific). Under these conditions, little or no alkaline hydrolysis of the FPI occurs. At the end of the reaction, the pH of the protein solution is then adjusted 4.5 to precipitate the protein. The suspension is centrifuged at 10000×g for 15 min. The protein sediment is washed with water at pH 4.5 and centrifuged. The final protein precipitate is then re-dissolved in water at pH 7.0 and lyophilized. The extent of acylation, i.e., the percentage of lysyl residues modified with EDTAD, is determined by the trinitrobenzenesulfonic acid (TNBS) method (2).

The extent of acylation can be varied so as to modulate the physical characteristics of the final gel product. This can be done quite easily by varying the ratio of protein to added EDTAD (or other acylating agent). The greater the amount of EDTAD added per unit protein, the greater the extent of modification.

Of course, the reaction conditions can be easily adjusted by one of skill in the art such that Reaction I prevails. For instance, a shortened incubation period, or omission of the incubation step entirely will tend to favor Reaction I, as will adding the EDTAD to a more concentrated FPI solution. Performing the acylation at an alkalinity closer to pH 9 tends to favor the Reaction I pathway over the Reaction II pathway.

Adjusting the relative rates of the two reactions will change the characteristics of the final protein hydrogel. While optimization of Reaction II yields a protein hydrogel having superior swellability and greater overall anionic charge, optimization of Reaction I yields a stiffer, less absorbent hydrogel, which is desirable in some applications. Knowledge of the interplay between the two reactions allows the physical characteristics of the final gel product to be tailored to fit a wide variety of final applications.

The ratio of reaction by the Reaction I pathway versus the Reaction II pathway can be determined by electrometric titration of various modified and unmodified FPI samples. The titration curves of the modified samples are then compared to unmodified samples subjected to the same reaction conditions. The number of carboxyl groups per $10^5$ gmole of protein is calculated from the number of moles of H+ ion dissociated (or, by the number of moles of NaOH consumed) by the protein during titration from pH 2.0 to the isotonic point of the protein. Titration curves for native soy protein, and soy protein subjected to pH 12 and 65° C. are essentially identical (data not shown), illustrating that heat treatment at pH 12 does not result in deamidation of the glutamine and asparagine residues of soy protein. Presumably, FPI behaves similarly. Knowing this, any increase in the carboxyl group content of FPI modified under these conditions must be due to incorporation of EDTAD at the lysyl residues of the FPI.

It must also be remembered that the crosslinking step, described in full below, also utilizes lysine residues within the protein to crosslink the protein chains. Therefore, it is preferred that the extent of modification not exceed 90% of available lysine residues. This maximum extent of modification should also be decreased if the starting protein is particularly low in lysine residues. In order to obtain the advantages of increased carboxyl moiety content, it is preferred that a minimum of 50% of the lysine residues of the starting protein be acylated.

After acylation, the protein solution is exhaustively dialyzed against deionized water to remove salts (in this case, primarily sodium EDTA) formed in the reaction. The dialyzed modified protein may be optionally lyophilized to yield an acylated protein. Alternatively, the protein can be precipitated by lowering the pH to 4.5, followed by centrifugation. The protein precipitate can then be dissolved in water and pH 8 to 9.

EDTAD is the preferred acylating agent because, inter alia, it is essentially non-toxic. The only reactive groups introduced into the protein by the addition of EDTAD are the carboxyl groups. When added to the protein isolate according to the protocol described above, any unreacted EDTAD will readily react with water and NaOH, to be converted into sodium ethylenediaminetetraacetic acid (EDTA). Since sodium EDTA is a "Generally Regarded As Safe" (GRAS) food additive, there is no concern in regard to the toxicity or environmental safety of any residual amount of sodium EDTA (if any) remaining in the modified protein. Unlike poly(acrylate) or poly(acrylamide)-based hydrogels, which may contain residual monomers which are toxic, the present protein hydrogel, if it contains any residual reagents, would only contain residual sodium EDTA.

While not being limited to any particular mode of operation, it is believed that the EDTAD acylating agent, by reaction with the lysyl residues of the protein, causes extensive unfolding of the protein molecules via intramolecular electrostatic repulsion caused by the carboxylic acid substituents on the acylating agent. This is believed to convert the rigid, globular structure of fish globulins into a random-coil-type, polyanionic polymer. The substantial polyanionic character which the carboxylic acid moieties impart to the protein isolate are believed to provide numerous sites for water binding.

After acylation, the dialyzed and optionally lyophilized modified protein isolate is crosslinked using a bifunctional crosslinking reagent. A wide variety of suitable bifunctional crosslinking agents are known in the art. Dialdehydes, for instance, like dianhydrides, will also react with lysine residues to form crosslinks between polypeptide chains. Bifunctional aldehydes are excellent crosslinking reagents. In the present invention, any type of dialdehyde, without limitation, can function as a crosslinking reagent. The preferred bifunctional crosslinking reagent is a bifunctional aldehyde having the formula

wherein X is an integer of from 2 to 8. The preferred bifunctional aldehyde from within this small group of homologs is glutaraldehyde (X=3).

Crosslinking is preferably carried out in aqueous solution. Here, in order to maximize crosslinking (both intra and intermolecular linkages), a relatively concentrated protein solution is used, and the pH maintained at about pH 7 to pH 10. For instance, to a 10% aqueous solution of acylated FPI at pH 9.0 is added a suitable amount of a 25% aqueous solution of glutaraldehyde. For example, about 150 μl of the 25% glutaraldehyde solution would be added to 10 ml of the 10% protein solution.

The mixture is then thoroughly stirred, and cured overnight at room temperature. The cured gel is then air dried in an oven at 40° C.

FIG. 1 shows water uptake of unmodified fish protein (FP) and 80% EDTAD-FP hydrogels. The equilibrium water uptake of the unmodified FP was only about 6 g/g gel, whereas the water uptake of the 80% EDTAD-FP hydrogel reached an equilibrium value of about 200 g/g after 24 h of swelling. Clearly, introduction of three carboxyl groups at each lysyl residue in the protein enabled the protein network to imbibe a large amount of water. The rate and extent of swelling of hydrogels are governed by the rate of diffusion of water into the gel and the rate and extent of relaxation of the polymer network in response to water diffusion (5–7). The data in FIG. 1 show that the rate of water uptake by the dry (glassy) gel increased rapidly during the first hour and slowed thereafter. The initial rapid phase might be related to diffusion of water into and hydration of the charged groups in the polymer network. During this phase, in addition to hydrating the ionic groups, water may tend to disrupt polar protein-protein interactions in the gel network. This should enhance the relaxation rate of the polymer network. However, the decrease in the rate of swelling of the hydrogel after the first hour indicates that although the protein was denatured by exposing it at pH 12 and 65° C. prior to crosslinking with glutaraldehyde, its rate of structural relaxation in the gel network does not seem to be comparable to a truly random-coil polymer. Previously, (1, 4) it has been shown that even after exposure of soy and fish proteins to the above denaturing conditions, the proteins regained a significant amount of α-helix and β-sheet structures when the conditions were reversed back to pH 9 and room temperature. These folded secondary structures in the cross-linked protein network might oppose relaxation of the gel network as water diffuses into the network. It is probable that if protein chains in a crosslinked protein network are subjected to denaturing conditions, they may remain in a disordered state when the denaturant is removed because of steric constraints imposed by the cross-links.

To elucidate this hypothesis, after crosslinking with glutaraldehyde (and before drying), the gel was suspended in ethanol. Due to osmosis, ethanol penetrated into the gel and water diffused out of the gel into the ethanol solvent. After 3 h of exposure, the gel lost most of its water and collapsed into a dry solid. The dry gel was removed by filtration, dried in an oven at 35° C. for few minutes to remove ethanol, and its swelling properties were studied.

FIG. 2 shows the rate of water uptake of the gels of unmodified-FP and 80% EDTAD-FP prepared with the ethanol treatment. In the case of unmodified-FP, the equilibrium water uptake was about 15 gg, which is at least 2-fold greater than without the ethanol treatment (FIG. 1). Similarly, the equilibrium water uptake of the 80% EDTAD-FP was 425 g/g, which is more than 2-fold greater than that without the ethanol treatment (FIG. 1).

FIG. 3 shows the effect of ethanol treatment on water uptake of 60% EDTAD modified soy protein (60% EDTAD-SP). As in the case of fish proteins, ethanol treatment of soy protein hydrogel also significantly increased its rate and extent of swelling. This indicates that the swelling properties of all protein-based hydrogels can be dramatically improved by treating the freshly crosslinked gel with ethanol.

Comparison of the data in FIGS. 1 and 2 suggest that both the initial rate and the extent of swelling of the gels are markedly improved by the ethanol treatment. This is presumably due to ethanol-induced denaturation of protein in the gel network. To determine if ethanol treatment causes structural changes in proteins in the gel network, the CD spectra of swollen gels were analyzed.

FIG. 4 shows far UV-CD spectra of swollen gels of 80% EDTAD-FP prepared with and without the ethanol treatment. Qualitatively, the CD spectrum of the gel which was not subjected to ethanol treatment showed a major negative trough at 230 nm and a positive peak at 200 nm. This type of CD spectrum has been ascribed to proteins rich in type-I β-turns (8–11). In contrast, the CD spectrum of the ethanol-treated gel shows two major negative troughs at 209–210 nm and 221–223 nm regions, which are typical of a helical structure. Although it is difficult to quantitatively interpret the relationship between water uptake properties and the CD spectra of swollen gels, the data in FIG. 4 do highlight the fact that ethanol treatment alters conformational properties of proteins in the gel network and this in turn significantly impacts the water uptake properties of the gels.

The effect of propanol, butanol, and acetone treatment on the swelling properties of 80% EDTAD-FP gels was also investigated. The extent of equilibrium swelling of the gel treated with these solvents was slightly lower than gels treated with ethanol.

FIG. 5A shows the effect of ethanol treatment on the swelling properties of 80% EDTAD-FP in 0.1M NaCl at 36° C. The saline uptake of the gel which was not treated with ethanol was about 24 gg, whereas that of the gel treated with ethanol was about 35 g/g. The rate of saline uptake also apparently was higher with the ethanol treated gel than that without ethanol treatment. Similar behavior is also observed with uptake of 0.15 M saline (FIG. 5B). The improvement in the rate and extent of saline uptake of the ethanol treated gel must be related to an increase in the rate and extent of relaxation of the protein chains in the network.

FIG. 6 shows the effect of temperature on equilibrium water uptake by 80% EDTAD-FP gels. The logarithm of equilibrium water uptake versus reciprocal temperature plots for both the ethanol-treated and ethanol-untreated gels showed a linear behavior in the temperature range 5–40° C. The slopes of these plots were the same, suggesting that the enthalpy change (ΔH) for water uptake is the same for both these gels. Thus, the net difference in the absolute amount of water uptake at any given temperature must arise from differences in structural flexibility of the network (i.e., entropy related).

The following protocols are provided for illustrative purposes only to aid in a complete understanding of the claimed invention. It is understood that the examples do not limit the invention claimed herein in any manner.

Materials:

Walleyed pike (fish) was obtained fresh from a local fish farm. Ethylenediaminetetraacetic dianhydride (EDTAD) and butanol were from Aldrich Chemical Co. (Milwaukee, Wis.). Glutaraldehyde (50% aqueous solution) and propanol were obtained from Sigma Chemical Co. (St. Louis, Mo.). Absolute ethyl alcohol was purchased from Apper Alcohol and Chemical Co. (Shelbyville, Ky.). Heat sealable, water wettable paper was procured Bolmet Inc. (Dayville, Conn.). Dialysis tubing (m.w. cut off 6000–8000), acetone and ether were obtained from Fisher Scientific (Pittsburgh, Pa.) All other chemicals were of analytical grade. Deionized water was used for the swelling studies.

Protein Determination:

Because the modifying groups used in this study interfered with all colorimetric methods for determination of protein concentration, the protein concentration was determined by the dry weight method (1). A weighed aliquot of a protein stock solution in deionized water was dried to constant weight at 105° C. in a vacuum oven. The protein concentration was expressed as % w/v.

Modification of Fish Protein:

Chemical modification of the lysyl residues of the protein with EDTAD was carried out as reported elsewhere (1). One percent protein solution in water was prepared at pH 12 and incubated for 30 min at 650° C. The solution was cooled to room temperature and a calculated amount of EDTAD was added in incremental amounts with continuous stirring. After complete addition of EDTAD, the reaction mixture was stirred constantly for 3 h while maintaining the pH at 12.0. At the end of the reaction, the pH of the protein solution was adjusted to 4.5 to precipitate the protein. The suspension was centrifuged at 10,000 g for 15 min. The protein sediment was washed with water at pH 4.5 and centrifuged. The final protein precipitate was then re-dissolved in water at pH 7.0 and lyophilized. The extent of acylation, i.e., the percentage of lysyl residues modified with EDTAD, was determined by the trinitrobenzene-sulfonic acid (TNBS) method (2).

Preparation of Crosslinked Hydrogel:

A 10% dispersion of the EDTAD modified fish protein was prepared by dissolving the required amounts of protein in deionized water at pH 10 and mixed homogeneously with an egg beater for 15 to 20 min. Because of high viscosity, the 10% protein dispersion looked like a thick paste. To this was added a known amount of 50% glutaraldehyde solution (which was also preadjusted to pH 10) so that the ratio of protein to glutaraldehyde in the final mixture was about 1:0.035 (wt/wt). The mixture was mixed uniformly for about 15 min using an egg beater and allowed to cure overnight at room temperature. The cured gel was divided into two equal parts. One part was dried in an oven at 40° C. The other portion was suspended in ethanol for 3 h, during which time ethanol was changed at least twice. The ethanol treatment caused both denaturation of protein and dehydration of the crosslinked gel. At the end of the ethanol treatment, the gel was in the form of dried particles. The particles were further dried in an oven at 40° C. for two hours to remove ethanol and any residual moisture. Unmodified fish protein control gels were prepared in the same manner. After complete drying the gels were ground to particle size less than 1.0 mm and used for swelling studies.

Swelling Kinetics:

Swelling studies for all the above gels were done gravimetrically at 36° C. A weighed amount of dried gel was taken in triplicates in heat-sealable pouches and allowed to swell in deionized water. At specific time intervals the bags were removed and centrifuged at 214×g in a clinical centrifuge equipped with sample holders containing plastic wire mesh for proper drainage of the expelled water to the bottom of the holder. The weight of the swollen gel was determined immediately. Appropriate controls for the wet weight of the pouch were included. The wet pouch with swollen gel was dried in a oven at 104° C. to constant weight. The final dry weight of the gel was determined by subtracting the dry weight of an equivalent empty pouch treated in the same manner. The water uptake was determined as g water absorbed per g dry gel. The effect of ionic strength on water uptake was studied in a manner similar to that described above by immersing the gel samples in 0.1 M and 0.15 M NaCl solutions. The influence of temperature on water uptake was studied in the range of 5–40° C. in temperature controlled water baths.

Circular Dichroic Measurements:

Qualitative CD measurements were made in a computerized spectropolarimeter (On-Line Instruments Systems, Inc., Jefferson, Ga.). The gels, swollen in water, were placed between two quartz plates (2.5×2.5 cm) separated by 0.8 mm thick spacers and the cell sealed. The far UV CD spectrum of the sandwiched gel was recorded in the 190–240 nm range. Twenty scans of each sample were averaged and all spectra were corrected for the appropriate water baseline. Since the samples were in the form of gel, the spectra were recorded in the millidegree mode, instead of the ellipticity mode which would require the exact concentration of protein in the gel.

The lysine content of the crude protein isolated from the fish muscle contained about 9 residues per 10,000 molecular weight. Reaction of the crude protein with EDTAD at a protein-to-EDTAD weight ratio of 1:0.2 resulted in acylation of about 80% of the lysyl residues in the fish protein (80% MFP). At a protein-to-EDTAD ratio of 1:0.25 (w/w), about 90% of the lysyl residues were acylated (90% MFP). Previously, it has been reported that, under the reaction conditions used in this study, reaction of EDTAD with the protein lysyl groups results in introduction of about 3 carboxyl groups for each lysyl residue modified (3, 4).

It is understood that the present invention is not limited to the particular embodiment, reagents, steps, or methods described herein, but embraces all such forms thereof as come within the scope of the attached claims.

BIBLIOGRAPHY

1. D-C.Hwang and S. Damodaran, Synthesis and Properties of Fish Protein-Based Hydrogel. *J. Amer. Oil Chem. Soci.* 74, 1165 (1997).
2. R. J. Hall, N. Trinder and D. I. Givens, Observations on the Use of 2,4,6-trinitrobenzenesulphonic Acid for the Determination of Available Lysine in Animal Protein Concentrates. *Analyst*, 98, 673 (1973).
3. D-C. Hwang and S. Damodaran, Chemical Modification Strategies for Synthesis of Protein-based Hydrogel. *J. Agric. Food Chem.* 44, 751 (1996).
4. D-C.Hwang and S. Damodaran, Equilibrium Swelling Properties of a Novel Ethylenediaminetetraacetic Dianhydride (EDTAD)-modified soy protein hydrogel. *J. Appl. Polym. Sci.*, 62, 1285 (1996).
5. S. H. Gehrke, Equilibrium Swelling, Kinetics, Permeability and Applications of Environmentally Responsive Gels. In Advances in Polymer Science 110—Responsive Gels: Volume Transitions II, K. Dusek, Ed., Springer-Verlag, Berlin, Heidelberg, 1993, p. 83.
6. Y. Okuyama, R. Yoshida, K. Sakai, T. Okano, and Y. Sakurai, *J. Biomater. Sci. Polym. Ed.*, 4, 545 (1993).
7. A. Dave, U. Vaishnav, R. Desai, A. Shah, B. Ankleshwaria, and M. Mehta, *J. Appl. Polym. Sci.* 58, 853 (1995).
8. S. M. Kelly and N. C. Price, *Biochemica Biophysica Acta* 1338, 161 (1997).
9. R. W. Woody, in *Methods in Enzymology*, C. H. W. Hirs, Ed., Academic, New York, 1995 vol.246, p.34–71.
10. N. J. Greenfield, *Anal. Biochem.* 235, 1 (1996).
11. J. T. Yang, C. -S. C. Wu, H. M. Martinez, in *Methods in Enzymology*, C. H. W. Hirs, Ed., Academic, New York, 1986 vol. 130, p.208–269.

What is claimed is:

1. A protein hydrogel comprising an acylated protein matrix, the acylated protein matrix being crosslinked with a bifunctional crosslinking reagent to yield a crosslinked protein matrix, the crosslinked protein matrix then being treated with a polar organic solvent.

2. The protein hydrogel according to claim 1, wherein the bifunctional crosslinking agent is a bifunctional aldehyde.

3. The protein hydrogel according to claim 2, wherein the bifunctional aldehyde is selected from the group consisting of

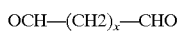

wherein X is an integer of from 2 to 8.

4. The protein hydrogel according to claim 1, wherein the bifunctional crosslinking agent is glutaraldehyde.

5. The protein hydrogel according to claim 1, wherein the acylated protein matrix comprises a protein derived from biomass.

6. The protein hydrogel according to claim 1, wherein the acylated protein matrix comprises a protein concentrate derived from biomass.

7. The protein hydrogel according to claim 1, wherein the acylated protein matrix comprises a protein isolate derived from biomass.

8. The protein hydrogel according to claim 7, wherein the protein isolate is a fish protein isolate.

9. The protein hydrogel according to claim 1, wherein the acylated protein matrix is a protein treated with an acylating agent.

10. The protein hydrogel according to claim 9, wherein the acylating agent is an anhydride.

11. The protein hydrogel according to claim 10, wherein the acylating agent is a tetracarboxylic acid dianhydride.

12. The protein hydrogel according to claim 10, wherein the acylating agent is ethylenediaminetetraacetic acid dianhydride.

13. The protein hydrogel according to claim 1, wherein the polar organic solvent is selected from the group consisting of $C_1$–$C_4$ alcohols, $C_1$–$C_4$ ketones, and $C_1$–$C_4$ aldehydes.

14. The protein hydrogel according to claim 13, wherein the polar organic solvent is selected from the group consisting of ethanol, propanol, butanol, and acetone.

15. The protein hydrogel according to claim 14, wherein the polar organic solvent comprises ethanol.

16. A protein hydrogel comprising:
a fish protein isolate, the fish protein isolate being acylated by treatment with ethylenediaminetetraacetic acid dianhydride to yield an acylated protein;
the acylated protein being crosslinked with glutaraldehyde to yield a crosslinked protein matrix; and
the crosslinked protein matrix being treated with a polar organic solvent.

17. A method of making a protein hydrogel, the method comprising the steps of:
(a) treating a protein with an acylating agent to yield an acylated protein;
(b) crosslinking the acylated protein with a bifunctional crosslinking agent to yield a crosslinked protein; and
(c) treating the crosslinked protein with a polar organic solvent.

18. The method according to claim 17, wherein in step (a) the protein is treated with an amount of acylating agent sufficient to acylate from about 1 to about 98% of lysine residues within the protein.

19. The method according to claim 17, wherein in step (a) the protein is treated with an anhydride.

20. The method according to claim 17, wherein in step (a) the protein is treated with a tetracarboxylic acid dianhydride.

21. The method according to claim 20, wherein in step (a) the protein is treated with ethylenediaminetetraacetic acid dianhydride.

22. The method according to claim 20, wherein in step (b) the acylated protein is crosslinked with a dialdehyde.

23. The method according to claim 22, wherein in step (b) the dialdehyde is selected from the group consisting of $$OCH-(CH2)_x-CHO$$

wherein X is an integer of from 2 to 8.

24. The method according to claim 23, wherein in step (b) the dialdehyde is glutaraldehyde.

25. The method according to claim 17, wherein:
in step (a) the acylating agent is added to an aqueous protein solution of about pH 12, at a temperature of about 65 to 100° C. to yield the acylated protein; and
in step (b) crosslinking is effected by addition of glutaraldehyde to an aqueous solution of the acylated protein of step (a) to yield a crosslinked protein; and
in step (c) the crosslinked protein is treated with a polar organic solvent selected from the group consisting of $C_1-C_4$ alcohols, $C_1-C_4$ ketones, and $C_1-C_4$ aldehydes.

26. The method according to claim 25, wherein in step (c) the crosslinked protein is treated with a polar organic solvent selected from the group consisting of ethanol, propanol, butanol, and acetone.

27. The method according to claim 26, wherein in step (c) the crosslinked protein is treated with ethanol.

* * * * *